(No Model.) 3 Sheets—Sheet 1.
E. P. MONROE.
METALLIC PACKING.
No. 464,332. Patented Dec. 1, 1891.
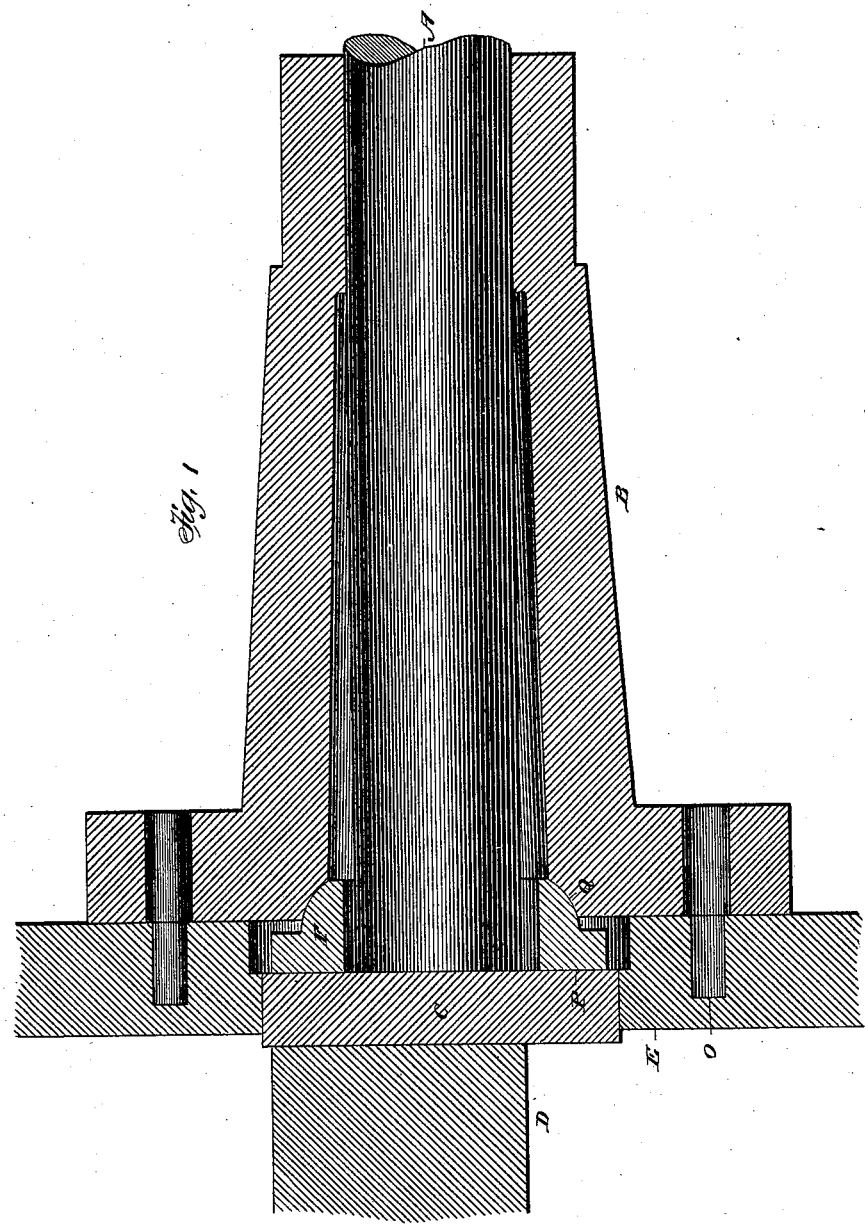
Witnesses:
F. P. Cornwall.
M. W. Church
Inventor:
E. P. Monroe
By Hopkins & Atkins
Attorneys

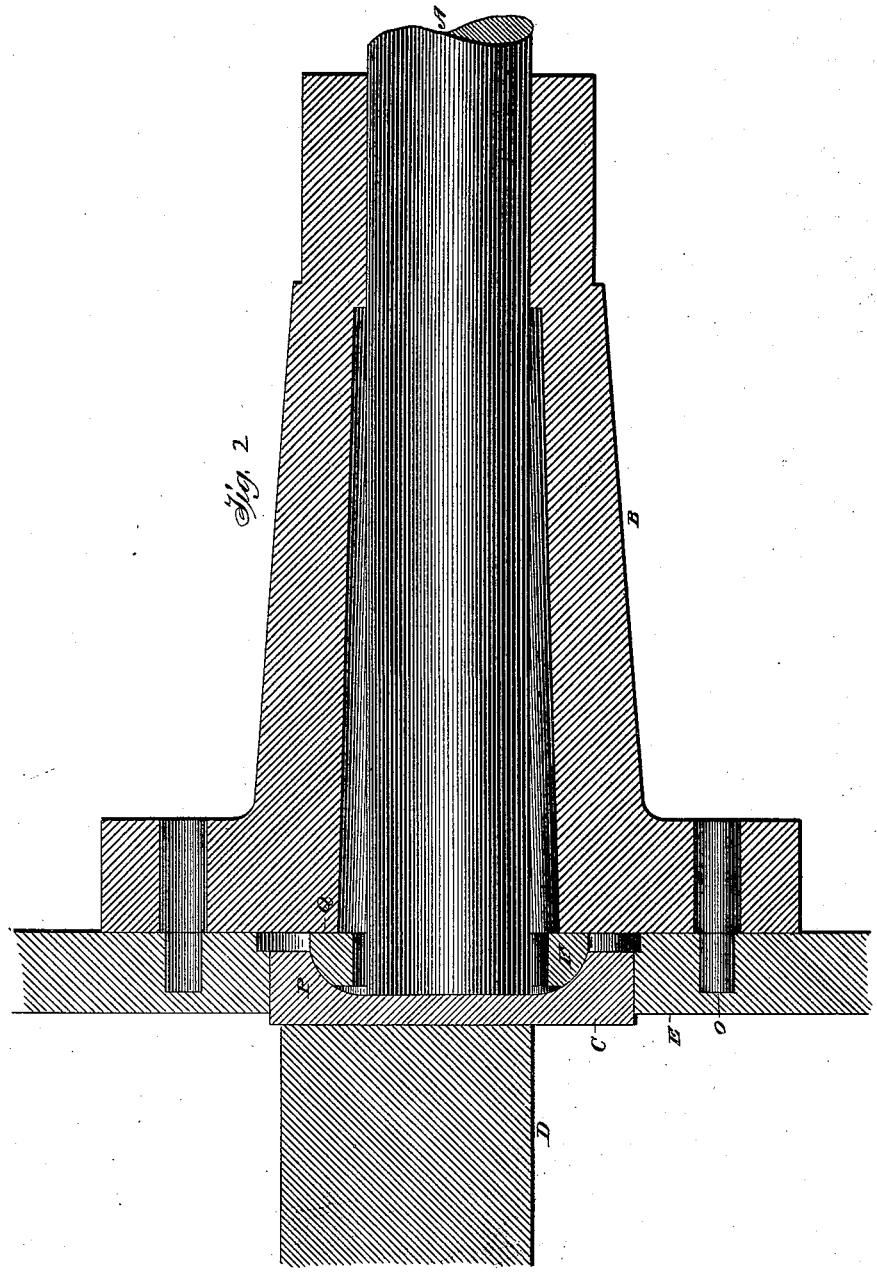

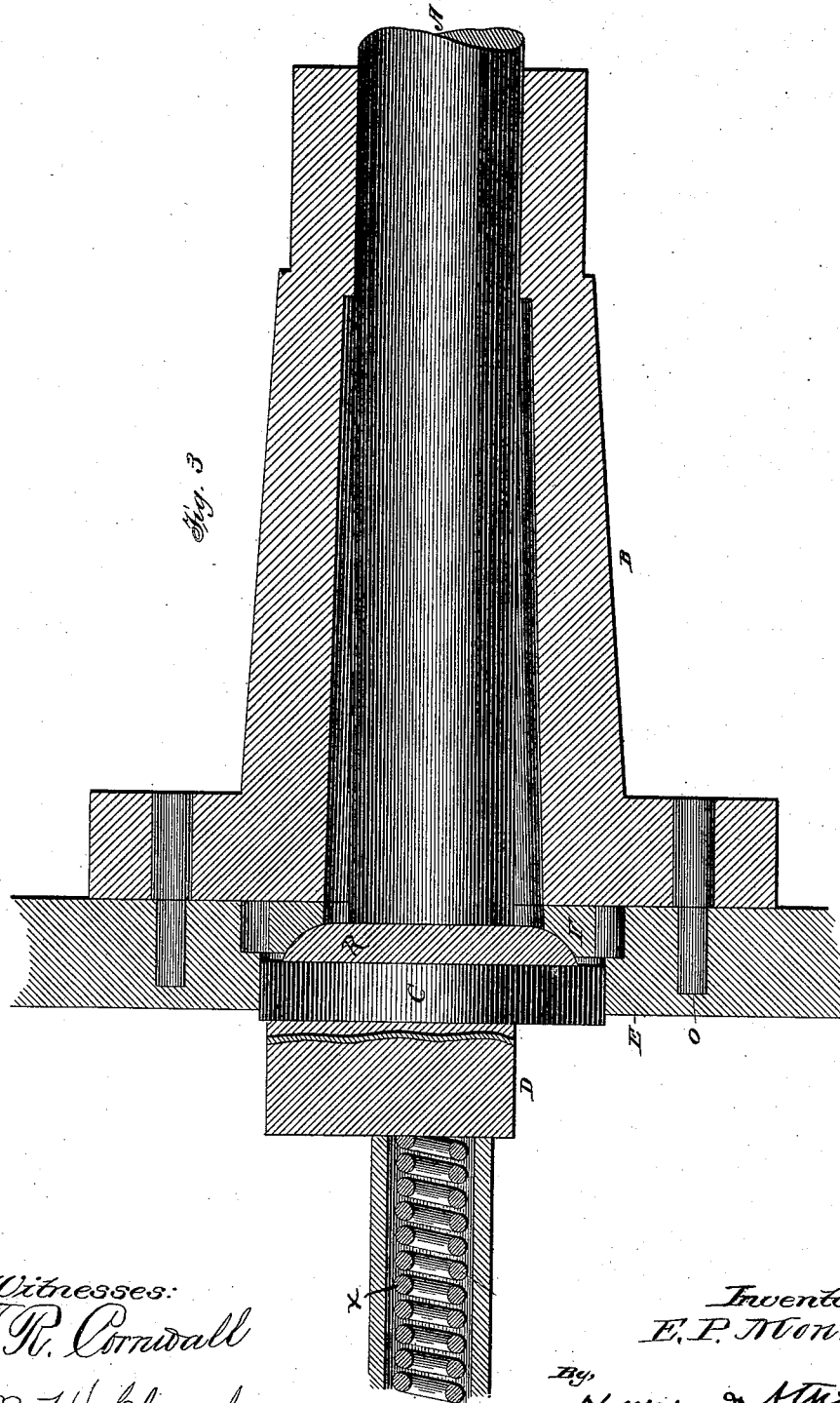

UNITED STATES PATENT OFFICE.

EDWIN P. MONROE, OF PHILADELPHIA, PENNSYLVANIA.

METALLIC PACKING.

SPECIFICATION forming part of Letters Patent No. 464,332, dated December 1, 1891.

Application filed August 10, 1891. Serial No. 402,280. (No model.)

*To all whom it may concern:*

Be it known that I, EDWIN P. MONROE, of Philadelphia, county of Philadelphia, and State of Pennsylvania, have invented certain new and useful Improvements in Metallic Packings, of which the following is a specification, reference being had to the accompanying drawings.

My improvements relate more particularly to metallic packings suitable to be employed in connection with spindles or shafts that have rotary or oscillatory movement in their bearings—such, for example, as valve-spindles of Corliss engines, calender-rolls, or other rotating surfaces which require steam-tight-packings.

My improvements are designed not only to be applicable to new work, but are also applicable as the substitutes for the packings of old machinery.

In Figure 1, for convenience of illustration, I show a longitudinal diametrical section of a valve-stem of a Corliss engine with so many of its connected parts as are necessary to illustrate the construction and operation of my improvement. In this figure a ball-and-socket ring of peculiar form is shown as a substitute for packing. Fig. 2 is a similar section and shows a simple modification in which the collar of the shaft is recessed so as to form a bearing for the ball-and-socket ring. Fig. 3 is another similar section showing a modification in which a collar is applied to the shaft so as to rest upon the ordinary collar C and to form a bearing for the ball-and-socket ring. In this figure is illustrated a coiled spring *x*, the function of which is to keep all the parts pressed together to insure steam-tight joints; but this spring is not new and forms no part of my invention. It is applicable to all the constructions shown in the different figures.

Referring to the letters upon the drawings, A indicates a shaft, which may be, for example, a stem of a Corliss engine, the axle of a calender-roll, or other rod or shaft.

B indicates a bracket ordinarily used in connection with the valve-stem of a Corliss engine.

C indicates a collar ordinarily used upon and integral with or firmly secured to such a stem, and D a wing for operating the valve.

E indicates one of the walls of a steam-chest, and F a ball-and-socket ring.

The foregoing parts are common in somewhat different forms to each one of the figures of the drawings.

In Fig. 1 the ball-and-socket ring is applied to the bracket, and is also made to bear directly upon the collar of the shaft, and ground bearing-surfaces are provided to form steam-tight joints at P and Q, and a vibrating cup and packing are not used.

Fig. 2 shows the ball-and-socket ring in reverse position to that shown in Fig. 1, its flat surface being in contact with the bracket and its convex surface inserted in a corresponding cavity formed in the collar C, the joints being steam-tight.

In Fig. 3 the ball-and-socket ring has plano-concave bearing-surfaces, the concave surface being fitted to the convex surface formed upon a ring R, which may be integral with the collar or applied upon the shaft as a separate part. In this figure is shown a coiled spring *x*, which is commonly used in connection with the spindle of a Corliss engine to throw the parts forward in the direction of the bracket and hold them in their proper position. O indicates ordinary bolt-fastenings.

Other modifications of my improvements might be employed without departing from the substance of my invention; but I have illustrated a sufficient number to show its general application.

What I claim is—

1. In a metallic packing, the combination, with the shaft A and bracket B, of a collar C, integral with or firmly secured to the shaft, and the ball-and-socket ring bearing, respectively, upon the bracket and the collar, substantially as set forth.

2. In a metallic packing, the combination, with the shaft A and bracket B, of collar C, integral with or firmly secured to the shaft, the ball-and-socket ring, and the ring R, substantially as set forth.

In testimony of all which I have hereunto subscribed my name.

EDWIN P. MONROE.

Witnesses:
J. R. MASSEY,
AUGUST WEBER.